(12) United States Patent
Hunter

(10) Patent No.: US 6,449,603 B1
(45) Date of Patent: Sep. 10, 2002

(54) SYSTEM AND METHOD FOR COMBINING MULTIPLE LEARNING AGENTS TO PRODUCE A PREDICTION METHOD

(75) Inventor: Lawrence E. Hunter, Potomac, MD (US)

(73) Assignee: The United States of America as represented by the Secretary of the Department of Health and Human Services, Washington, DC (US)

( * ) Notice: Subject to any disclaimer, the term of this patent is extended or adjusted under 35 U.S.C. 154(b) by 0 days.

(21) Appl. No.: 09/180,998

(22) PCT Filed: May 23, 1997

(86) PCT No.: PCT/US97/08951

§ 371 (c)(1),
(2), (4) Date: Nov. 19, 1998

(87) PCT Pub. No.: WO97/44741

PCT Pub. Date: Nov. 27, 1997

Related U.S. Application Data

(60) Provisional application No. 60/018,191, filed on May 23, 1996.

(51) Int. Cl.[7] ................................................. G06N 3/02
(52) U.S. Cl. ................................................. 706/15; 706/21
(58) Field of Search ..................................... 706/15, 21

(56) References Cited

U.S. PATENT DOCUMENTS 5,199,077 A * 3/1993 Wilcox et al. .............. 704/256

OTHER PUBLICATIONS

David R. H. Miller, Tim Leek and Richard M. Schwartz; A hidden Markov model information retrieval system, Proceedings on the 22nd annual international ACM SIGIR conference on Research and development in information retrieval, Jan. 1999, pp. 214–221.

Jian–Yun Nie, Martin Brisebois and Xiaobo Ren; On Chinese text retrieval, Proceedings of the 19th annual international ACM SIGIR conference on Research and development in information retrieval, Jan. 1996, pp. 225–233.*

Fei Song and W. Bruce Croft, A general language model for information retrieval Proceedings on the 22nd annual international ACM SIGIR conference on Research and development in information retrieval, Jan. 1999, pp. 316–321.*

Zhaohui Zhang; Yuanhui Zhou; Yuchang Lu; Bo Zhang, Extracting rules from a GA–pruned neural network, Systems, Man and Cybernetics, 1996., IEEE International Conference on, vol. 3, Oct. 14–17, 1996, pp. 1682–1685 vol. 3.*

(List continued on next page.)

Primary Examiner—Wilbert L. Starks, Jr.
(74) Attorney, Agent, or Firm—Klarquist Sparkman, LLP

(57) ABSTRACT

System and method for improving the performance of learning agents such as neural networks, genetic algorithms and decision trees that derive prediction methods from a training set of data. In part of the method, a population of learning agents of different classes is trained on the data set, each agent producing in response a prediction method based on the agent's input representation. Feature combinations are extracted from the prediction methods produced by the learning agents. The input representations of the learning agents are then modified by including therein a feature combination extracted from another learning agent. In another part of a method, the parameter values of the learning agents are changed to improve the accuracy of the prediction method. A fitness measure is determined for each learning agent based on the prediction method the agent produces. Parameter values of a learning agent are then selected based on the agent's fitness measure. Variation is introduced into the selected parameter values, and another learning agent of the same class is defined using the varied parameter values. The learning agents are then again trained on the data set to cause a learning agent to produce a prediction method based on the derived feature combinations and varied parameter values.

22 Claims, 12 Drawing Sheets

OTHER PUBLICATIONS

Brasil, L.M.; De Azevedo, F.M.; Barreto, J.M.; Noirhomme–Fraiture, M., A neuro–fuzzy–GA system architecture for helping the knowledge acquistion process, Intelligence and Systems, May 21–23, 1998. Proceedings., IEEE International Joint Symposia on, 1998.*

Fukumi, M.; Akamatsu, N., Rule extraction from neural networks trained using evolutionary algorithms with deterministic mutation, Neural Networks Proceedings, 1998. IEEE World Congress on Computational Intelligence. The 1998 IEEE International Joint Confe.*

Zhou Yuanhui; Lu Yuchang; Shi Chunyi, Combining neural network, genetic algorithm and symbolic learning approach to discover knowledge from databases, Systems, Man, and Cybernetics, 1997. Computational Cybernetics and Simulation., 1997 IEEE International.*

Quinlan, *C4.5: Programs for Machine Learning*, Morgan Kaufmann Publishers, Inc., pp. 1–302, 1993.

Vilalta et al., "Integrating Feature Construction with Multiple Classifiers in Decision Tree Induction," Beckman Institute and Department of Computer Science, pp. 1–9, 1993.

Rendell et al., "Improving the Design of Induction Methods by Analyzing Algorithm Functionality and Data–Based Concept Complexity," *Machine Learning: 13$^{th}$ International Joint Conference on Artificial Intelligence*, pp. 952–958, 1993.

Rendell et al., "Empirical Learning as a Function of Concept Character," *Machine Learning*, vol. 5, pp. 267–298, 1990.

Dietterich, "Limitations on Inductive Learning," *Proceedings of the Sixth International Workshop on Machine Learning*, pp. 124–128, 1989.

van Camp, "A Users Guide for the Xerion Neural Network Simulator Version 4.1," pp. 1–24, 1995.

Forrest, "Genetic Algorithms," *The Computer Science and Engineering Handbook*, Tucker, ed., pp. 557–571, Dec. 1996.

* cited by examiner

SYSTEM AND METHOD FOR COMBINING MULTIPLE LEARNING AGENTS TO PRODUCE A PREDICTION METHOD

This application claims priority from a provisional application No. 60/018,191 filed May 23, 1996.

FIELD OF THE INVENTION

This invention relates generally to artificial intelligence and machine learning. More particularly, this invention relates to a system and method for combining learning agents that derive prediction methods from a training set of data, such as neural networks, genetic algorithms and decision trees, so as to produce a more accurate prediction method.

BACKGROUND OF THE INVENTION

Prior machine learning systems typically include a database of information known as a training data set from which a learning agent derives a prediction method for solving a problem of interest. This prediction method is then used to predict an event related to the information in the training set. For example, the training set may consist of past information about the weather, and the learning agent may derive a method of forecasting the weather based on the past information. The training set consists of data examples which are defined by features, values for these features, and results. Continuing the example of weather forecasting, an example may includes features such as barometric pressure, temperature and precipitation with their corresponding recorded values (mm of mercury, degrees, rain or not). The resulting weather is also included in the example (e.g., it did or did not rain the next day). The learning agent includes a learning method, a set of parameters for implementing the method, and an input representation that determines how the training data's features will be considered by the method. Typical learning methods include statistical/Bayesian inference, decision-tree induction, neural networks, and genetic algorithms. Each learning method has a set of parameters for which values are chosen for a particular implementation of the method, such as the number of hidden nodes in a neural network. Similarly, each application of a learning method must specify the representation, that is, the features to be considered; for example, the semantics of the neural network's input nodes.

One clear lesson of machine learning research is that problem representation is crucial to the success of all learning methods (see, e.g. Dietterich, T., "Limitations on Inductive Learning," *Proceedings of Sixth International Workshop on Machine Learning* (pp. 125–128), Ithaca, N.Y.: Morgan Kaufman (1989); Rendell, L., & Cho, H., "Empirical Learning as a Function of Concept Character," *Machine Learning*, 5(3), 267–298 (1990); Rendell L., & Ragavan, H., "Improving the Design of Induction Methods by Analyzing Algorithm Functionality and Data-based Concept Complexity," *Proceedings of UCAI*, (pp. 952–958), Chambery, France (1993), which are all hereby incorporated by reference). However, it is generally the case that the choice of problem representation is a task done by a human experimenter, rather than by an automated machine learning system. Also significant in the generalization performance of machine learning systems is the selection of the learning method's parameter values, which is also a task generally accomplished by human "learning engineers" rather than by automated systems themselves.

The effectiveness of input representations and free parameter values are mutually dependent. For example, the appropriate number of hidden nodes for an artificial neural network depends crucially on the number and semantics of the input nodes. Yet up to now, no effective method has been developed for simultaneously searching the spaces of representations and parameter values of a learning agent for the optimum choices, thereby improving the accuracy of its prediction method.

Machine learning systems have also conventionally used a single learning agent for producing a prediction method. Until now, no effective method has been developed that utilizes the interaction of multiple learning agents to produce a more accurate prediction method.

An objective of the invention, therefore, is to provide a method and system that optimizes the selections of parameter values and input representations for a learning agent. Another objective of the invention is to provide a simple yet effective way of synergistically combining multiple learning agents in an integrated and extensible framework to produce a more accurate prediction method. With multiple and diverse learning agents sharing their output, the system is able to generate and exploit synergies between the learning methods and achieve results that can be superior to any of the individual methods acting alone.

SUMMARY OF THE INVENTION

A method of producing a more accurate prediction method for a problem in accordance with the invention comprises the following steps. Training data is provided that is related to a problem for which a prediction method is sought, the training data initially represented as a set of primitive features and their values. At least two learning agents are also provided, the agents including input representations that use the primitive features of the training data. The method then trains the learning agents on the data set, each agent producing in response to the data a prediction method based on the agent's input. Feature combinations are extracted from the prediction methods produced by the learning agents. The input representations of the learning agents are then modified by including feature combinations extracted from another learning agent. The learning agents are again trained on the augmented training data to cause a learning agent to produce another prediction method based on the agent's modified input representation.

In another method of the invention, the parameter values of the learning agents are changed to improve the accuracy of the prediction method. The method includes determining a fitness measure for each learning agent based on the quality of the prediction method the agent produces. Parameter values of a learning agent are then selected based on the agent's fitness measure. Variation is introduced into the selected parameter values, and another learning agent is defined using the varied parameter values. The learning agents are again trained on the data set to cause a learning agent to produce a prediction method based on the varied parameter values.

The two methods may be used separately or in combination. Results indicate a synergistic interaction of learning agents when both methods are combined, which provides yet a more accurate prediction method.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

The invention can be implemented in any number of ways with a computer program executing on a general purpose computer. The preferred embodiment includes a control program written in Carnegie Mellon Common Lisp 17f and the PCL Common Lisp Object System, resident on a computer-readable medium such as a hard or floppy disk, tape cartridge, etc., and running on a Silicon Graphics Indigo$^2$ computer workstation. The learning agents incorporated into this embodiment are all publicly available and include the C4.5 decision tree induction system, the C4.5rules extraction tool (Quinlan, 1991), the LFC++ constructive induction program (Rendell & Ragavan, 1993; Vilalta, 1993), and the conjugate gradient descent trained feedforward neural network (CG) from the UTS neural network simulation package (van Camp, 1994). Each of these learning agents has a method associated with an object class which defines how to execute the method, how to parse the results returned, and what the list, or vector, of free parameters is for the agent. Of course, the invention is not limited to the described computer or learning agents. Any computer system (single CPU, multiprocessor, etc.) capable of executing the control program and learning agents can be used, and any learning agents that produce prediction methods can be used.

Overview of the Machine Learning System

Figure 1:
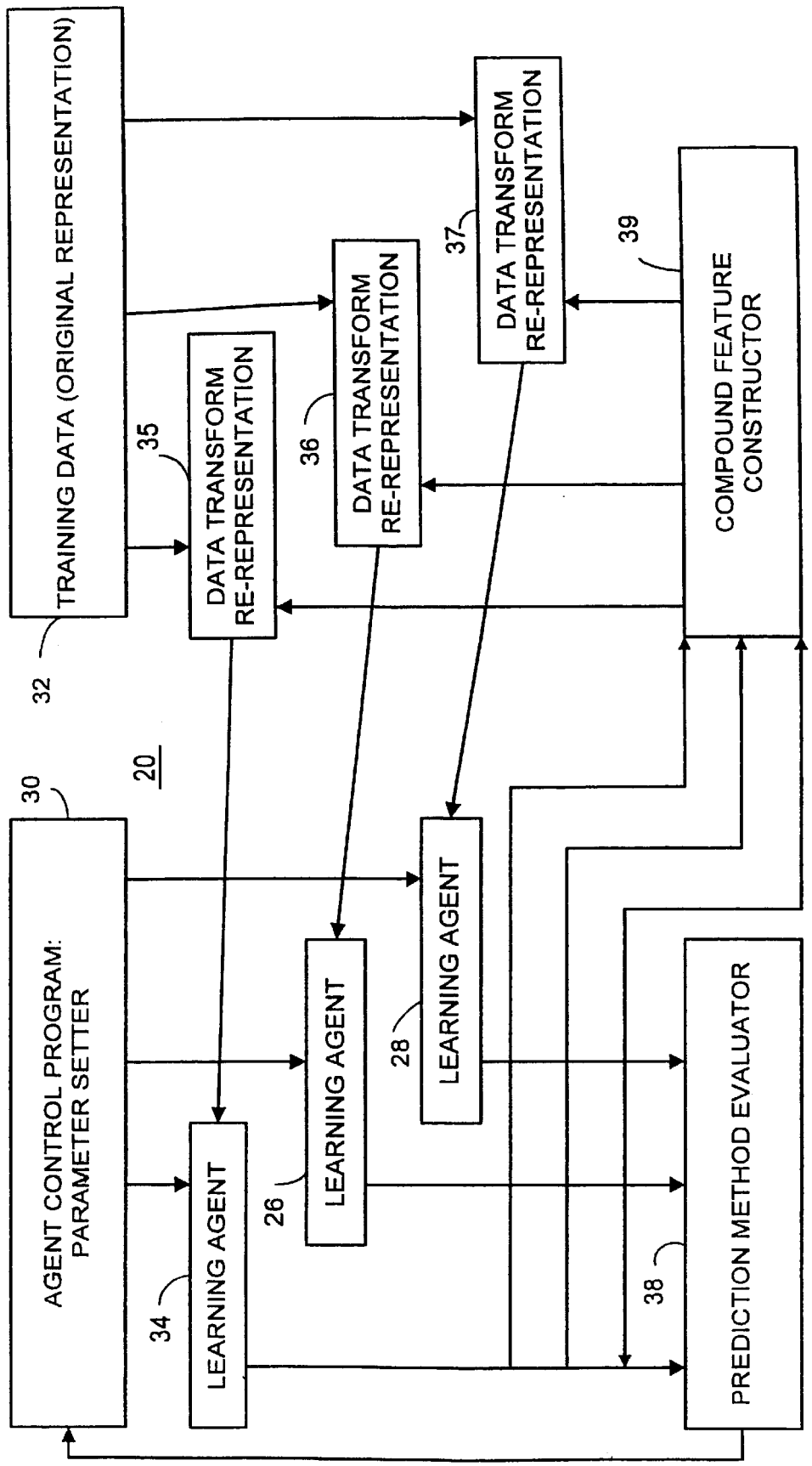
FIG. 1 is a block diagram of the software architecture of a machine learning system according to the invention.
Figure 8:
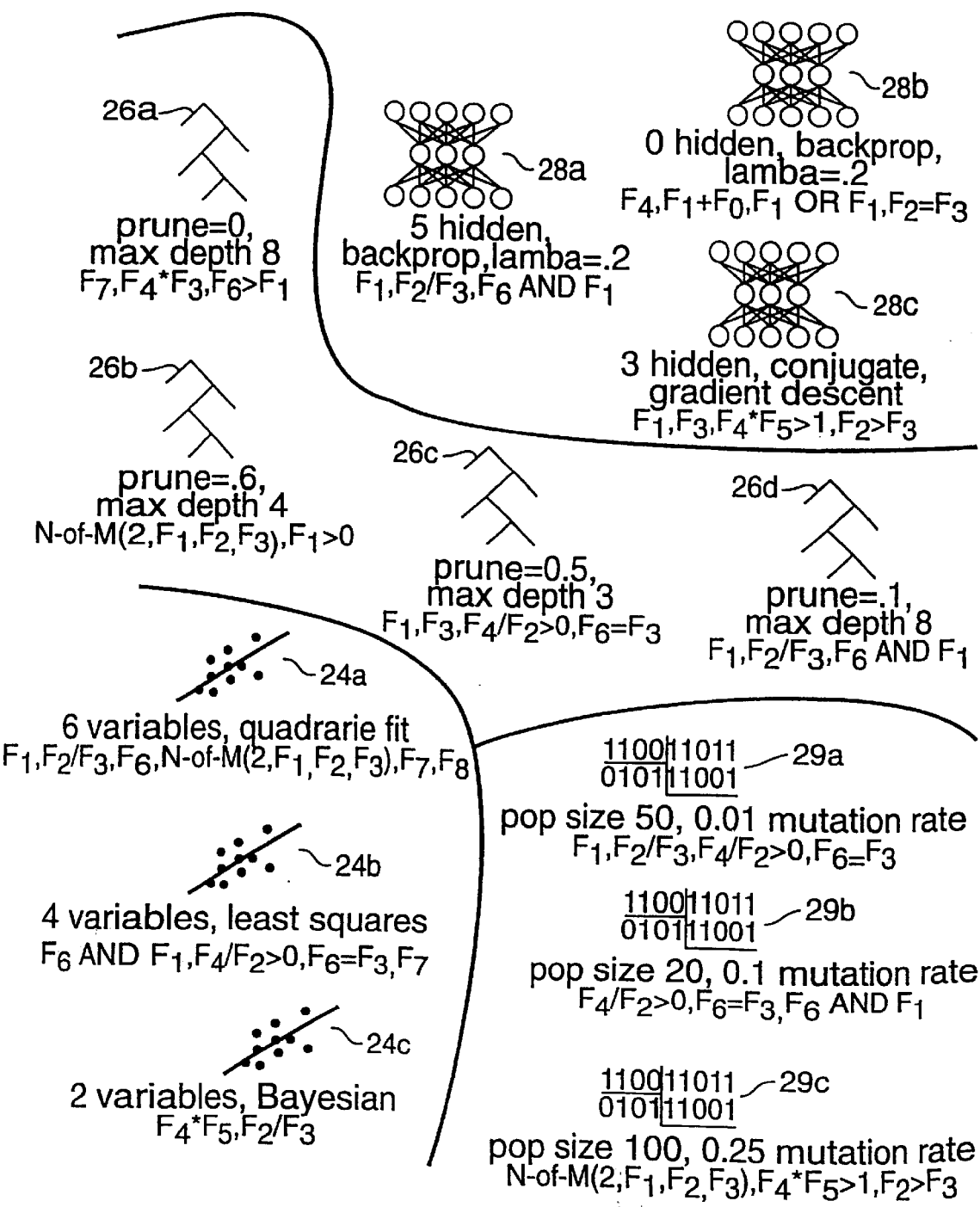
FIG. 8 is a pictorial diagram of a population of learning agents created in accordance with the invention.

FIG. 1 is a block diagram of the software architecture of a machine learning system 20 according to the invention. A population of learning agents such as agents 24–28 are controlled by an agent control program 30. Each learning agent includes a learning method, a set of parameters for implementing the method, and a representation of training data's features to be considered by the method. FIG. 8 shows a typical agent population comprising four classes of learning agents: statistical/mayesian inference method-based agents 24a–c, decision-tree induction method-based agents 26a–d, neural network method-based agents 28a–c, and genetic algorithm method-based agents 29a–c. Each learning agent includes a set of parameters values, such as the number of hidden nodes in a neural network (five hidden in agent 28a, zero hidden in agent 28b). Similarly, each learning agent includes a representation of the features considered by the learning method, such as the semantics of the neural network's input nodes (F1, F2/F3, etc.). Control program 30 sets parameter values and executes the learning method associated with each agent. The data input to each learning agent is derived from a knowledge data base such as training data set 32 by transforming the original data set according to a set of feature combinations specific to each agent. These specific transformation methods are represented in FIG. 1 by transforms 35, 36, and 37. However, in the initial execution of system 20, all agents are given the original, untransformed version of the training data.

Training data set 32 includes data examples which are defined by features, values for these features, and results. If the training set relates to weather prediction, an example may includes features such as barometric pressure, temperature and precipitation with their corresponding recorded values (mm of mercury, degrees, rain or not). The resulting weather is also included in the example (e.g., it did rain the next day or not).

Each of the learning agents 24–28 produces in response a prediction method based on the agent's input representation. The prediction methods are examined by a prediction method evaluator 38 that determines an unbiased estimate of the accuracy of the prediction method generated by each agent. The prediction accuracies are used by control program 30 to select new parameter settings for a next execution of the learning agents.

The prediction methods produced by the learning methods are also examined by a compound feature constructor 39. Constructor 39 extracts the combination of features in the agent's input representation that are determined to be the most important in producing the agent's prediction method. These extracted feature combinations are passed to the appropriate data transforms 35–37 for re-representing the training data for the next execution of the learning agents. As will be described, a feature combination can be passed to the same learning agent from whose prediction method it was extracted, to a different agent of the same class, or to a learning agent of a different class.

Both the parameter values and the input representations for learning agents 24–28 change for each system execution, thereby creating a new generation of learning agents each time. Execution of the learning agents continues until a prediction method that achieves a desired accuracy (such as 100%) is found or until a predefined time limit has expired.

The Overall Method

A method for producing a prediction method according to the invention functions by evolving the population of learning agents 24–28. The population is defined by a classification task T, a set of classified examples of that task expressed in a primitive representation $E_p$, a fitness function for agents $f_A$, and a set of learning agents A:

$$P_{coev} = \{T, E_p, f_A, A\}$$

A fitness function for agents maps a member of the set A to a real number between 0 and 1. For convenience, it is useful to define $P_L$ to be the subset of $P_{coev}$ where all the agents use learning method L (see below).

Each learning agent A is defined by a learning method L, a vector of parameter values v, a fitness function for memes $f_m$, and an ordered set of problem representation transformations R:

$$A_i = \{L, v, f_m, R\}$$

The set, or vector, of parameter values may have different length for different learning methods. Each member of the set of problem representation transformations $R_i$ is a mapping from an example $(e_p \epsilon E_p)$ to a value which is a legal element of an input representation for L (e.g. a real number, nominal value, bit, horn clause, etc.). The individual mappings are called memes. The ordered set of feature combinations $(R_i)$ is called the agent's memome, and the vector of parameter values is called its genoine. The fitness function for memes $f_m$ is a function that maps a member of the set $R_i$ to a real number between 0 and 1.

A transformed example $e_i$ is the result of sequentially applying each of the problem representation transformations $r_i \epsilon R_i$ to an example $e_p \epsilon E_p$. The application of the set of problem representation transformations to the set of examples in primitive representation results in a set of transformed examples, which is called $E_i$. When $E_i = E_p$, the transformation is said to be the identity.

Figure 2:
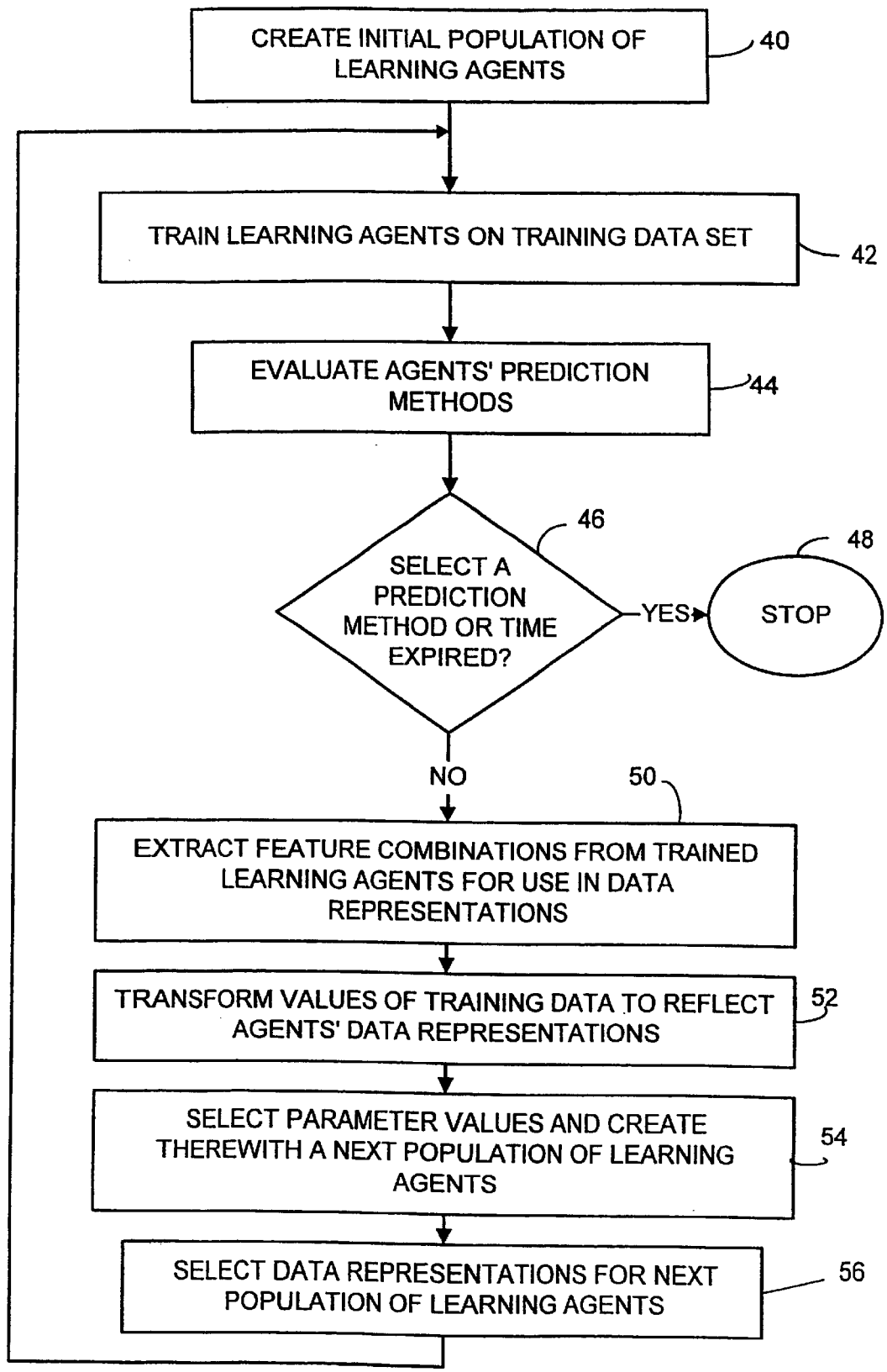
FIG. 2 is a flowchart of an overall method for producing a prediction method according to the invention.

Given a population as defined above, the process of coevolution is shown in FIG. 2 and in the pseudocode in Table 1.

TABLE 1

Initialize the population with random legal parameter vectors and the identity representation transformation.
\*     Determine the phenotype of each agent i by applying learning algorithm $L_i$ to transformed examples $E_i$ using parameter values $v_i$, using K-way cross-validation. The phenotype is an ordered set of: the output of the learning agent's cross-validation runs, the cross validation accuracies and the learning time.
       Determine the fitness of each agent by applying $f_A$ to the phenotype
of each agent.
       Create new memes by parsing the output in each learning agent's phenotype and extracting important feature combinations. The union of all memes generated by all members of the population is called the meme pool.
       Exchange memes. For each agent i, apply its meme fitness function $F_m$ to elements of the meme pool. Select the agent's target number of memes (a free parameter) from the meme pool with a probability proportional to the fitness of the memes.
         Repeat from \* meme-transfers-per-generation times
         Determine phenotype of the agents with their new memes
         Determine the fitness of the agents
         Create the next generation of agents by mutation, crossover and fitness proportional reproduction. Agents whose genomes are mutated keep their memomes intact. For each pair of agents whose genomes are crossed over to create a new pair of agents, the memomes of the parents are arbitrarily assigned to the offspring.
         Repeat from \* until a member of the population can solve the problem As a first step 40, an initial population of learning agents is created. These agents are typically though not necessarily of different classes, such as agents 24–28. Each of the learning agents is then trained on the training data (step 42). This training comprises supplying the data to the learning methods in a form that allows the methods to utilized their parameter values and input representations. As a result of the training, each of the learning agents produces a prediction method. The prediction methods are evaluated to determine their fitness (step 44). A decision based on the fitness measure (or time expired) is then made to select a prediction method or to continue to evolve the learning agents (step 46). If time has expired or the fitness measure of a prediction method is sufficient, then the method ends. If neither of these events occurs, then the method proceeds to produce another set of prediction methods.

The next step in the method is to extract feature combinations from the trained learning agents for use in future input representations (step 50). With knowledge of these extracted feature combinations, the control program transforms the features of the training data to reflect the future input representations (step 52). For example, if it determined that the mathematical combination of F1 times F2 is important for the learning agents, then the training data is transformed to provide a feature that has the value of F1 times F2.

Another step in the method is to select parameter values from the learning agents based on the fitness of their prediction methods and create therefrom a next population of learning agents (step 54). As will be described, this selection includes copying and varying parameter values among learning agents in a class.

The method concludes with selecting input representations for the next population of learning agents (step 56). This step is the process for evaluating the various fitness combinations extracted from the prediction methods and then matching them with the different learning agents in the population.

Creating the Initial Agent Population

Figure 3:
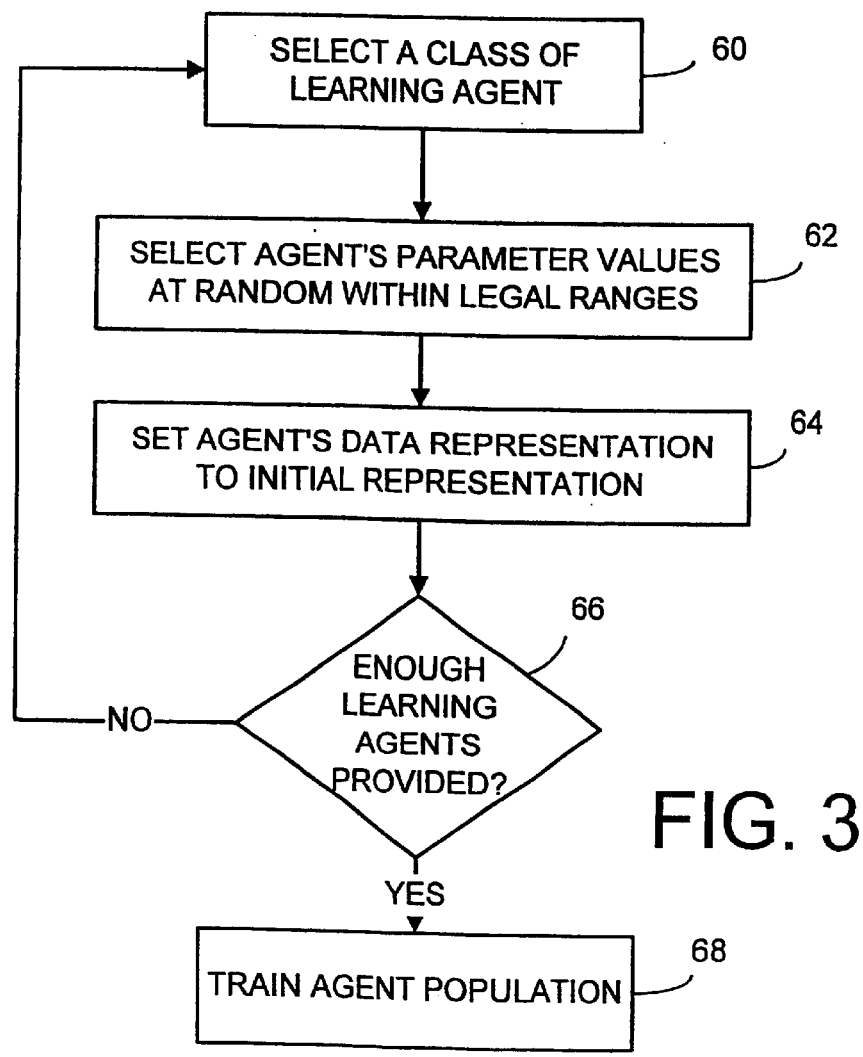
FIG. 3 is a flowchart of a preferred method of creating an initial agent population according to the overall method of FIG. 2.

FIG. 3 is a flowchart of a preferred way of creating an initial agent population according to the invention. To begin, each learning agent has a set of primitive features as its initial input representation (60). There are at least two classes of learning agent, each with a list of parameters and their legal ranges (62). Training data set 22 is also provided (64).

First, a learning agent is selected from a class, such as a neural network-based agent 28a (step 60). The agent's parameter values are then selected at random within their legal ranges (step 62). The agent's input representation is also set to an initial representation (step 64). A decision is then made if there are enough learning agents provided (step 66). If not, more agents of various classes are created (steps 60–66). If so, the creating step is complete, and the method proceeds with training the agents population (step 68).

Evaluating Agents' Prediction Methods

In addition to defining the fitness of features, system 20 must define the fitness of learning agents themselves for the evolution of parameter values.

Figure 4:
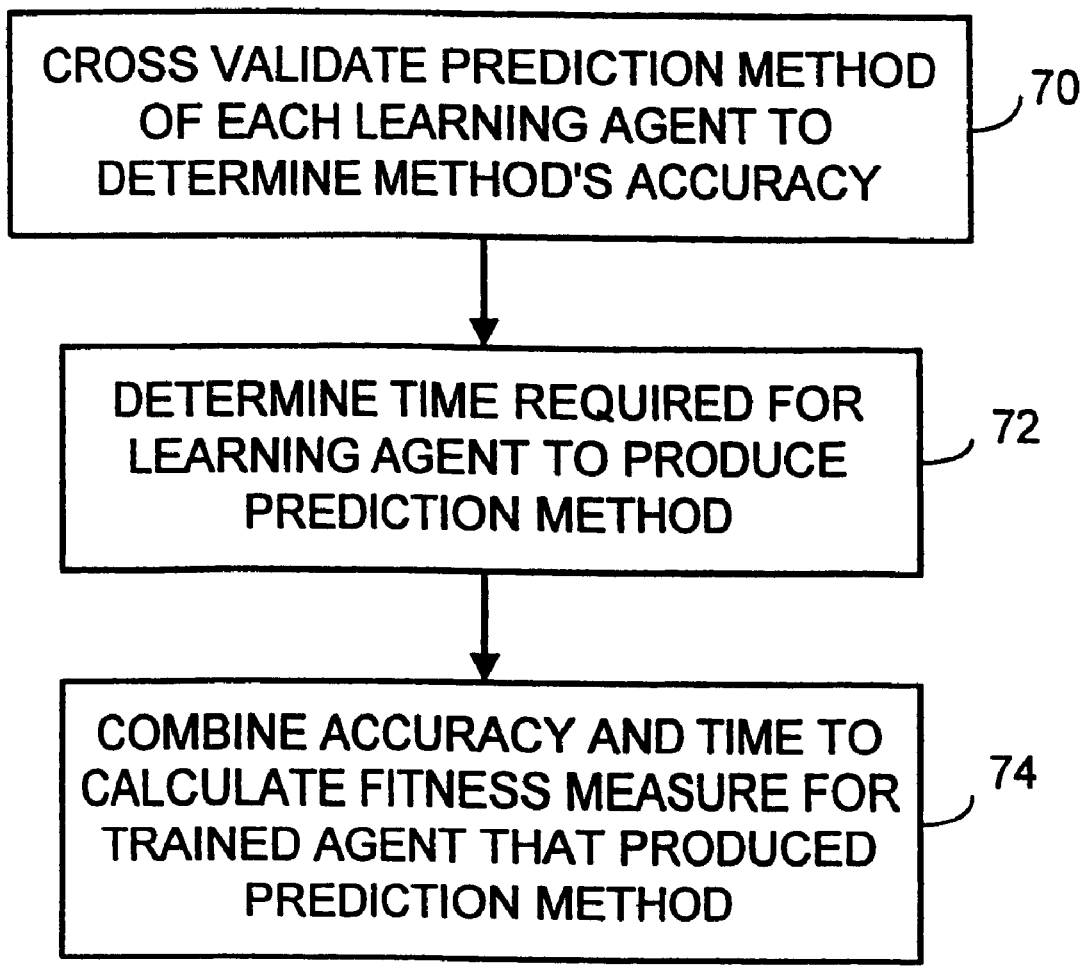
FIG. 4 is a flow chart of a preferred method of evaluating learning agents' prediction methods according to the overall method.

FIG. 4 is a flowchart of a preferred way of evaluating the agents' prediction methods. While a number of techniques are known in the art for evaluating the accuracy of a prediction method, the preferred way uses the following steps. First, cross validation is applied to the prediction method of each learning agent to determine an unbiased estimate of the method's accuracy (as a percent of correct predictions) (step 70). Cross validation is a well established statistical technique that is widely know in the machine learning art. See, for example, its description in *Computer Systems That Learn,* by Weiss and Kulikowski (1991). Additionally, the time required for a learning agent to produce its prediction method is determined (step 72). The cross validation number and time are then combined to calculate a fitness measure of the trained agent (step 74).

The fitness function for learning agents was selected to evolve learning agents that are accurate, robust and fast:

$$f(A_i) = C(A_i) - \sqrt{S(A_i)} - k\left(\frac{t_{A_i} - t_A}{S(t_A)}\right)$$

where $C(A_i)$ is the cross-validation accuracy of the agent $A_i$, $S(A_i)$ is the standard deviation of that accuracy, $t_{A_i}$ is the time it took for that agent to learn, $t_A$ is the mean execution time for that type of agent, $S(t_A)$ is the standard deviation of that mean, and k is a constant that trades off the value of accuracy versus that of learning time. Execution time is measured as the number of standard deviations from the mean learning time for that class of learning agents so that classes of learning agents with different training times can coexist in the same population. In the inventive system, k was selected to be 3 and accuracies and standard deviations are measured in percentage points. So, a learning agent that had a mean accuracy of 80%, a standard deviation of 9% and took 1 standard deviation less than the mean training time for that class of learning agent would get a fitness score of $80 - \sqrt{9} - (-1) = 78$.

Extracting Feature Combinations (Memes)

The main difference between coevolution learning and other evolutionary methods derives from the creation and exchange of memes. The meme creation process takes the output of learning agents that have been applied to a particular problem, and identifies combinations of the input features that the learning agent determined were relevant in making the desired distinction. The process of parsing output and creating new memes is specific to each learning method. For example, a program that learns rules from examples might create new memes from the left hand sides of each of the induced rules. Or, a program that learned weights in a neural network might create new memes that were the weighted sum of the inputs to each of its hidden nodes (perhaps thresholded to remove marginal contributions). Specific meme generation methods are discussed in more detail in the implementation section, below.

Figure 5:
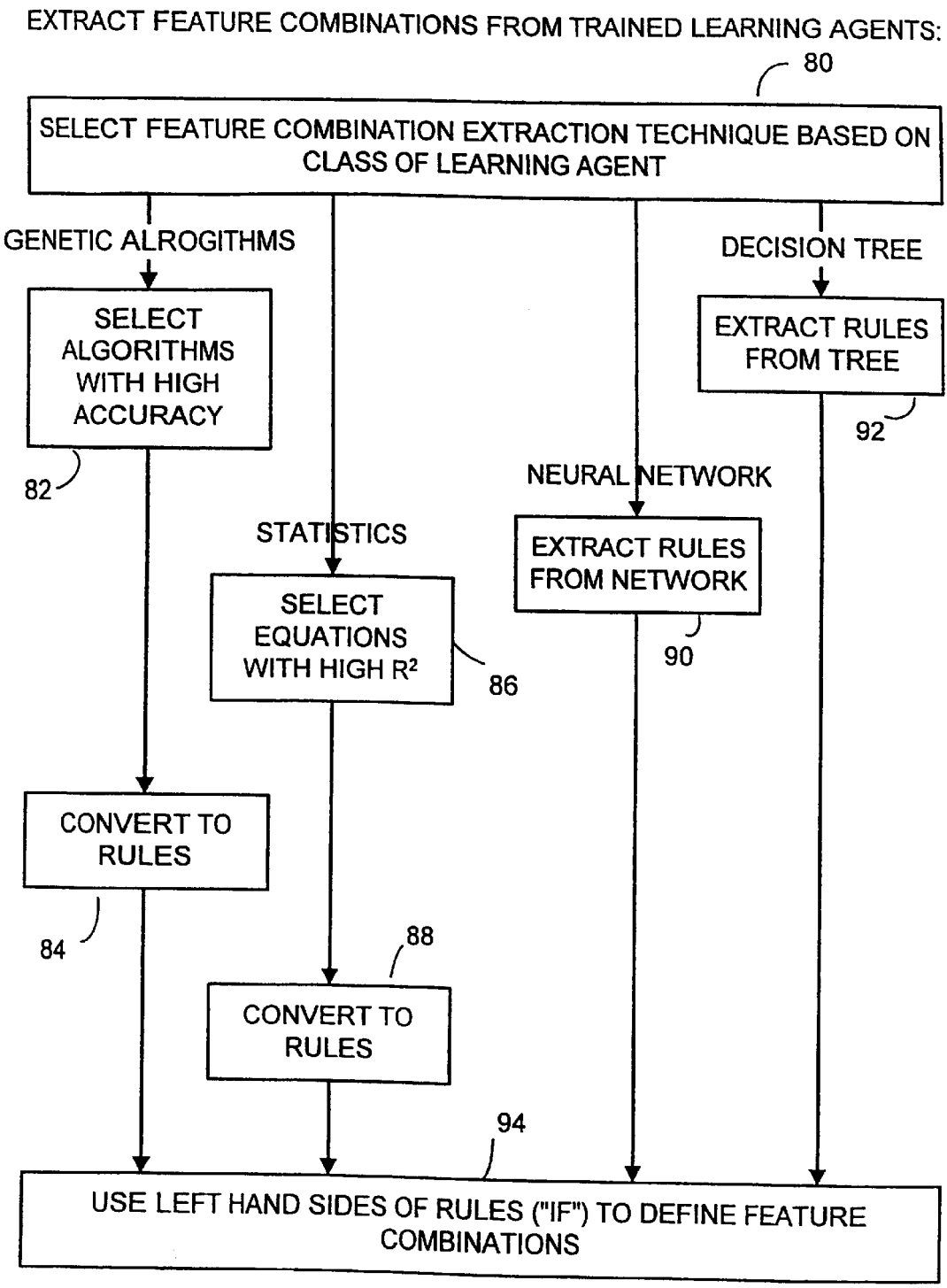
FIG. 5 is a flowchart of a preferred method of creating a next population of learning agents according to the overall method.

FIG. 5 is a flowchart of a preferred way of extracting feature combinations from trained learning agents. Different classes of agents require different extraction technique, and the extraction technique selected is based on the agent class (step 80). For genetic algorithm-based agents 30, the algorithms with the highest accuracy are selected (step 82) and are converted to rules (step 84). For statistical/Bayesian inference method-based agents 24a–c, the statistics with the highest correlation are selected (step 86) and converted to rules (step 88). For neural network method-based agents 28, the rules are extracted from the network (step 90) using known techniques such as described by Craven and Shavlik in "Extracting Tree-structured Representations of Trained Network," *Proceedings of the Conference on Neural Information Processing Systems* (1996) or by Towell and Shavlik in "The Extraction of Refined Rules form Knowledge-based Neural Network." *Machine Learning* (1993). For decision-tree induction method-based agents 26, the rules are extracted from the tree (step 92) as done, for example, by the program C4.5rules described above and incorporated herein by reference. The left hand sides of the rules, from whatever agent, are then used to define the feature combinations.

Creating a Next Population of Learning Agents

The creation of the next generation of agents is a minor variant on traditional genetic algorithms. Instead of having the genome be "bits" it is a vector of parameter values. The crossover, mutation and fitness proportional reproduction functions are all identical with the related operations on bit vectors in genetic algorithms. It is, of course, possible to transform parameter vectors into bitstring representations themselves, if it were desirable. In addition to using parameter vectors instead of bits, the other difference is that each subpopulation using a particular learning method (the $P_L$'s) has its own type of parameter vector, since the free parameters and their legal values vary among learning methods. These parameter vectors may be of different sizes, so crossover can only be applied with members of the same subpopulation.

Figure 6:
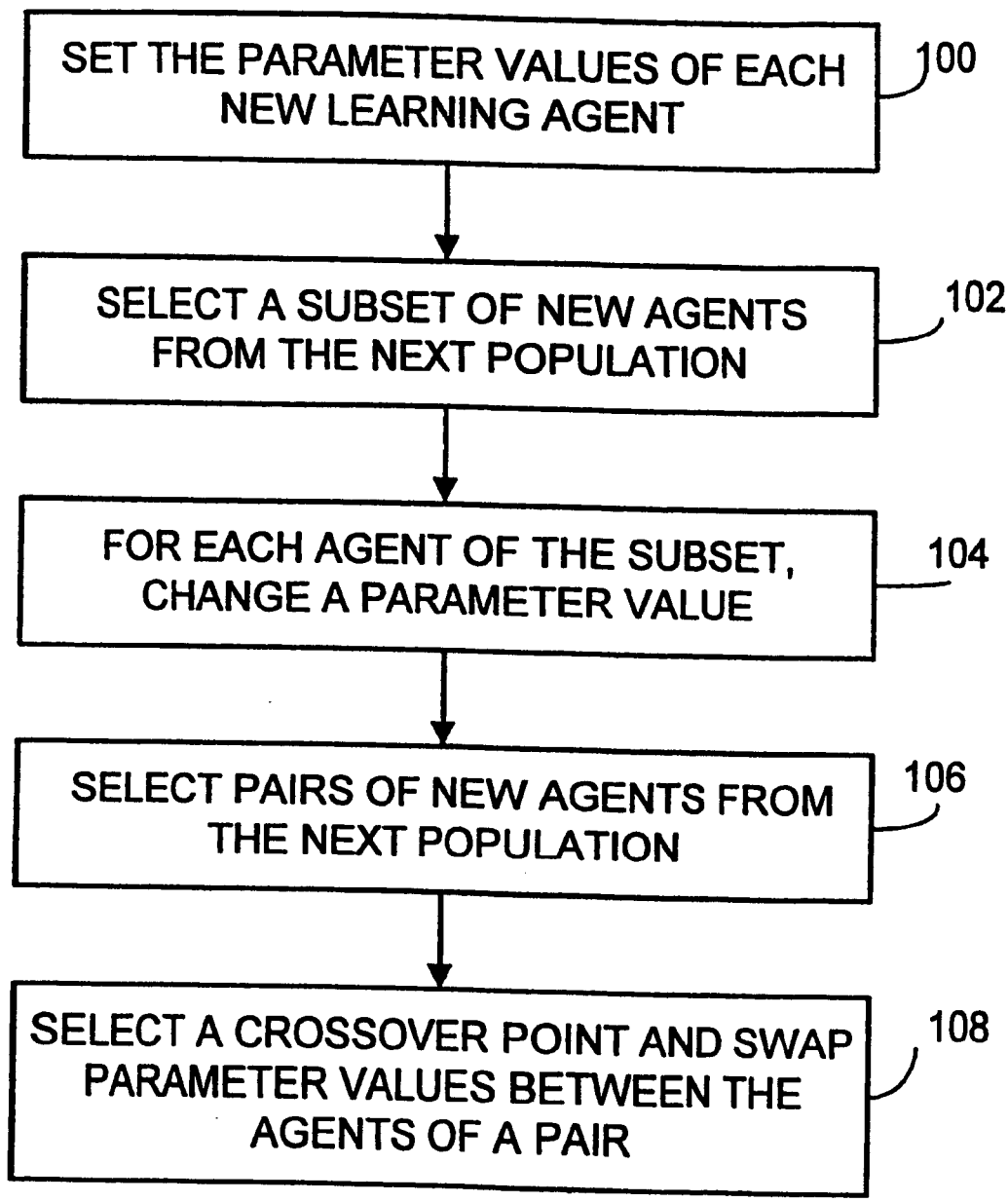
FIG. 6 is a flowchart of a preferred method of extracting feature combinations according to the overall method.
Figure 9:
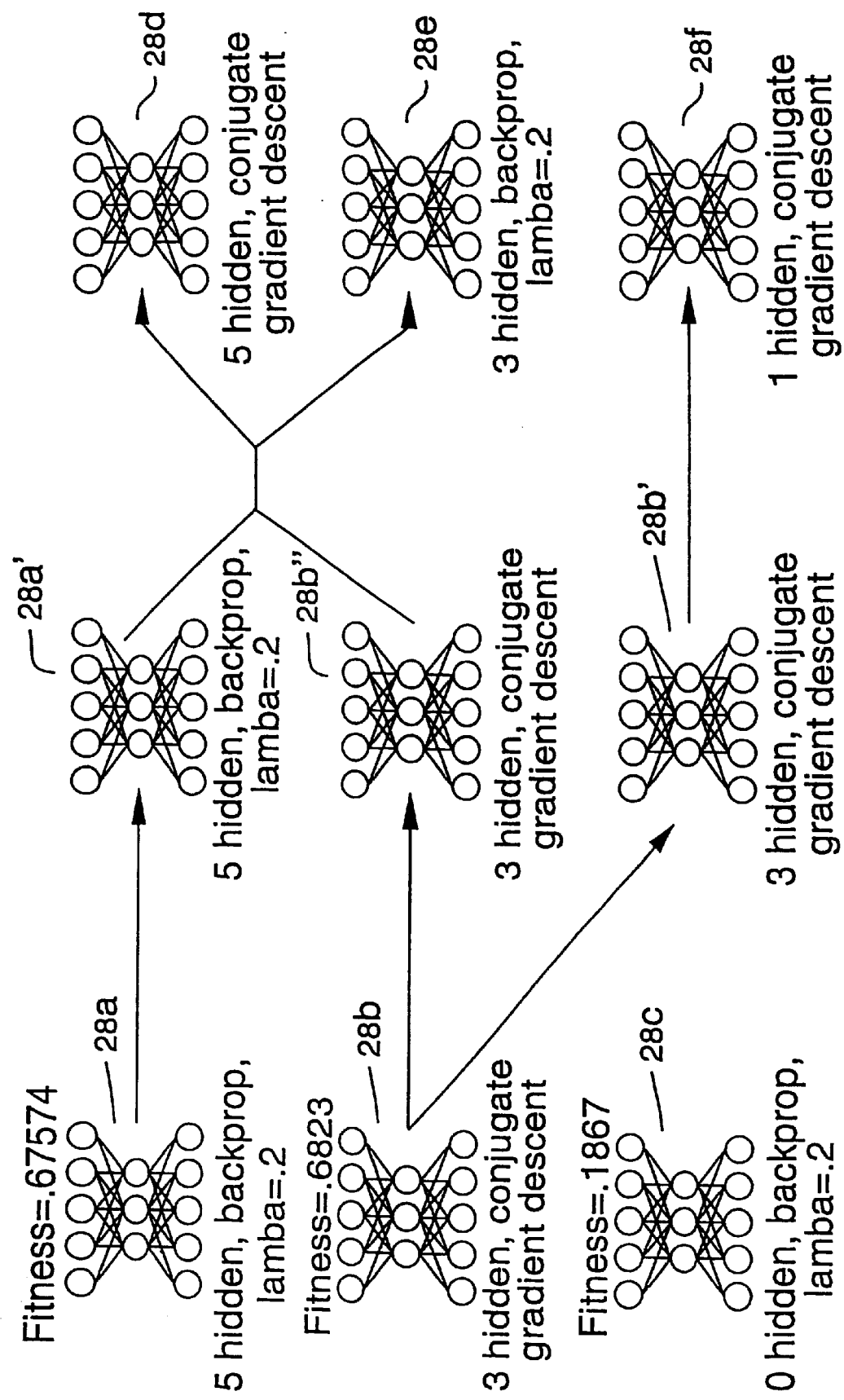
FIG. 9 is a pictorial diagram of the method of creating a next population of learning agents in accordance with the invention.

FIG. 6 is a flowchart of a preferred method for creating a next population, or generation, of learning agents in accordance with the invention. The steps of this method are best understood with reference to FIG. 9, which shows how they apply to change the parameter values of the three neural network-based agents 28a–c. From the evaluation of the agents' prediction methods (FIG. 3), fitness measures for each of the agents have been calculated. These are shown in FIG. 9 as decimal fractions such as 0.67574 for agent 28a, 0.6823 for agent 28b, and 0.1867 for agent 28c. Parameter values for each agent in the next generation are then set (step 100). These are set preferably by randomly selecting a trained agent within the class (e.g., neural network-based agents) and copying its parameter values, with the probability of selection proportional to the fitness measure of the trained agent. For example, in FIG. 9, because of the relative fitness measures agent 28a is selected once for the next generation of agents (agent 28a'), agent 28b is selected twice (agents 28b' and 28b"), and agent 28c is not selected.

In a next step 102, a subset of the new agents is then randomly selected. In FIG. 9, this subset is agent 28b'. The subset, of course could be more than one new agent. For each agent of the subset, a parameter is randomly selected, and its value is randomly set (step 104). In the example of FIG. 9, the parameter indicating the number of hidden nodes in the neural network is selected and its value is changed from 3 to 1. This creates a mutated, final agent version 28f that differs from the intermediate form 28b' by the number of hidden nodes.

One or more pairs of agents are then selected from the intermediate population (step 106) and parameter values are crossed over, or swapped (step 108). In the example of FIG. 9, agents 28a' and 28b" are the pair of selected agents, and the parameter values for back propagation and lambda are swapped to form two new agents 28d and 28e.

The next population of learning agents is then ready for training on the training data. In FIG. 9, this next population comprises agents 28d–f in the neural network class. Other classes of learning agents would similarly have new generations.

Selecting Input representations for Learning Agents

Memes (feature combinations) must be assigned fitnesses by agents. It is possible for each agent to have its own method of determining meme fitness. However, a simplified method is used in the preferred embodiment of the invention. Whenever a program generates a new meme, its fitness is defined to be the average "importance" of the feature combination, weighted by the accuracy of the learning agents that used the meme. In Durham's terms, the inventor of the new meme "imposes" its belief in its value on others. In addition, receivers of memes have a parameter which determines how much weight they put on memes they generate themselves versus memes generated by others. This mechanism could be straightforwardly generalized to weight the fitnesses of memes generated by different classes of agents differently. Importance is defined differently for different learning methods. For C4.5 and LFC++, the importance of a feature combination is the ratio of correctly classified examples that triggered the rule containing the feature to the total number of occurrences of the feature. So, for example, if "A and not B" is a feature extracted from a single C4.5 learning agent that had a 80% cross-validation accuracy, and 9 of the 10 examples the feature appeared in were classified correctly by the rule containing the feature, it's importance would be 9/10 and its fitness would be 0.9*0.8=0.72. For UTS, the importance of a feature is the absolute value of the ratio of the weight from the hidden node that defined the feature to the threshold of the output unit. If there is more than one output unit, it is the maximum ratio for any of the output units. Features that play a significant role in learning agents that are accurate have higher fitness than features that do not play as much of a role or appear in learning agents that are less accurate. It is possible for a feature to have relatively low prevalence in the population and yet still be important if it tends to generate correct answers when it is used.

Figure 7:
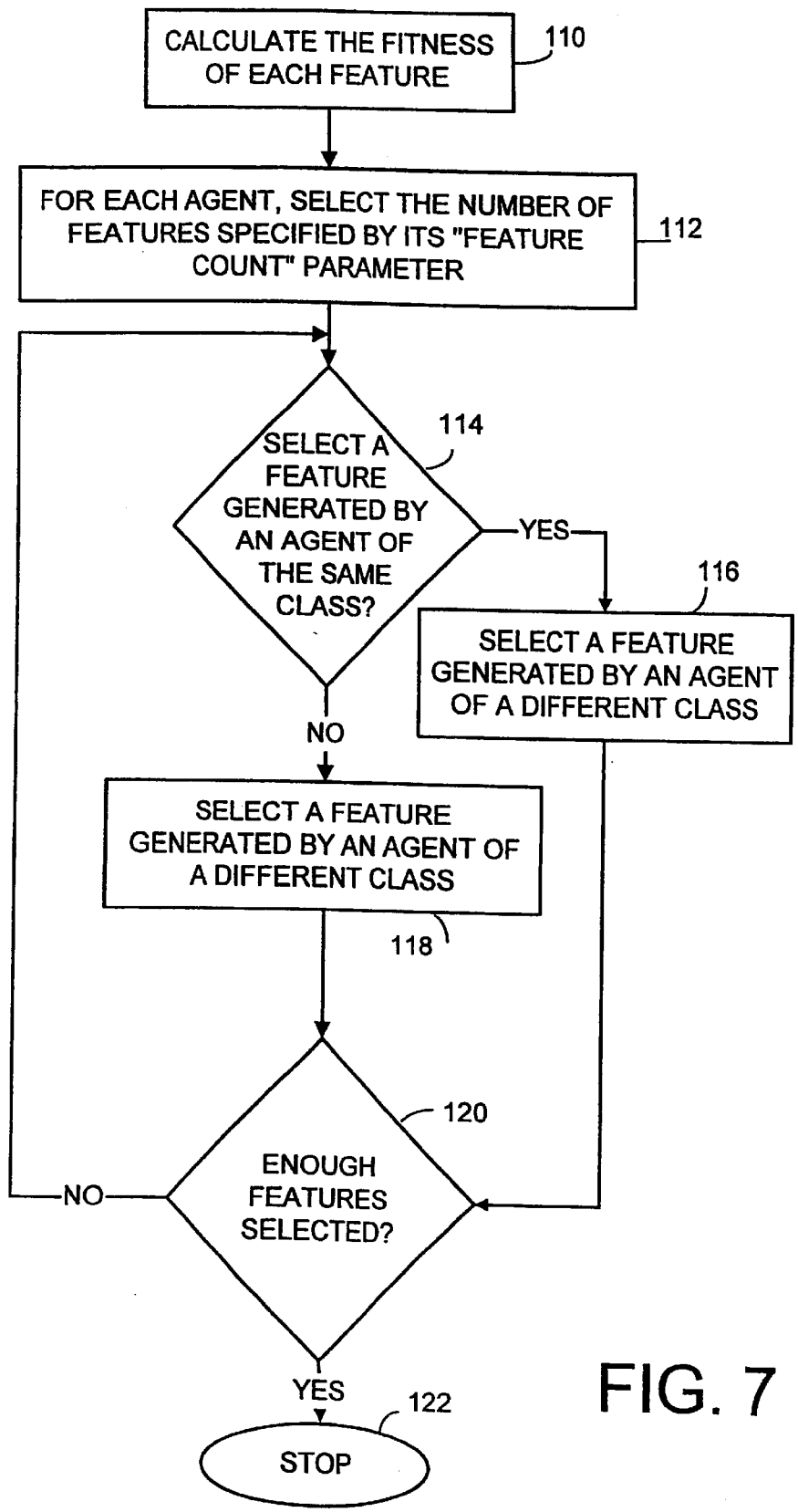
FIG. 7 is a flowchart of a preferred method of selecting input representations according to the overall method.

FIG. 7 is a flowchart that illustrated the process for selecting input representations for learning agents. First the fitness for each feature (i.e., feature combination) is calculated (step 110) in the manner described above. Then for each agent, the number of features specified by its "feature count: parameter is selected (step 112). A decision is then made whether to select a feature generated by an agent of the same class (step 114). If so, the feature is selected based on its fitness (step 116). If not, a feature from another class of agents is selected, again based on its fitness (step 118). A further decision is then made whether the learning agent has selected enough features for its input representation (step 120). If not, then steps 114–120 are repeated until enough features have been selected (step 122).

Figure 10:
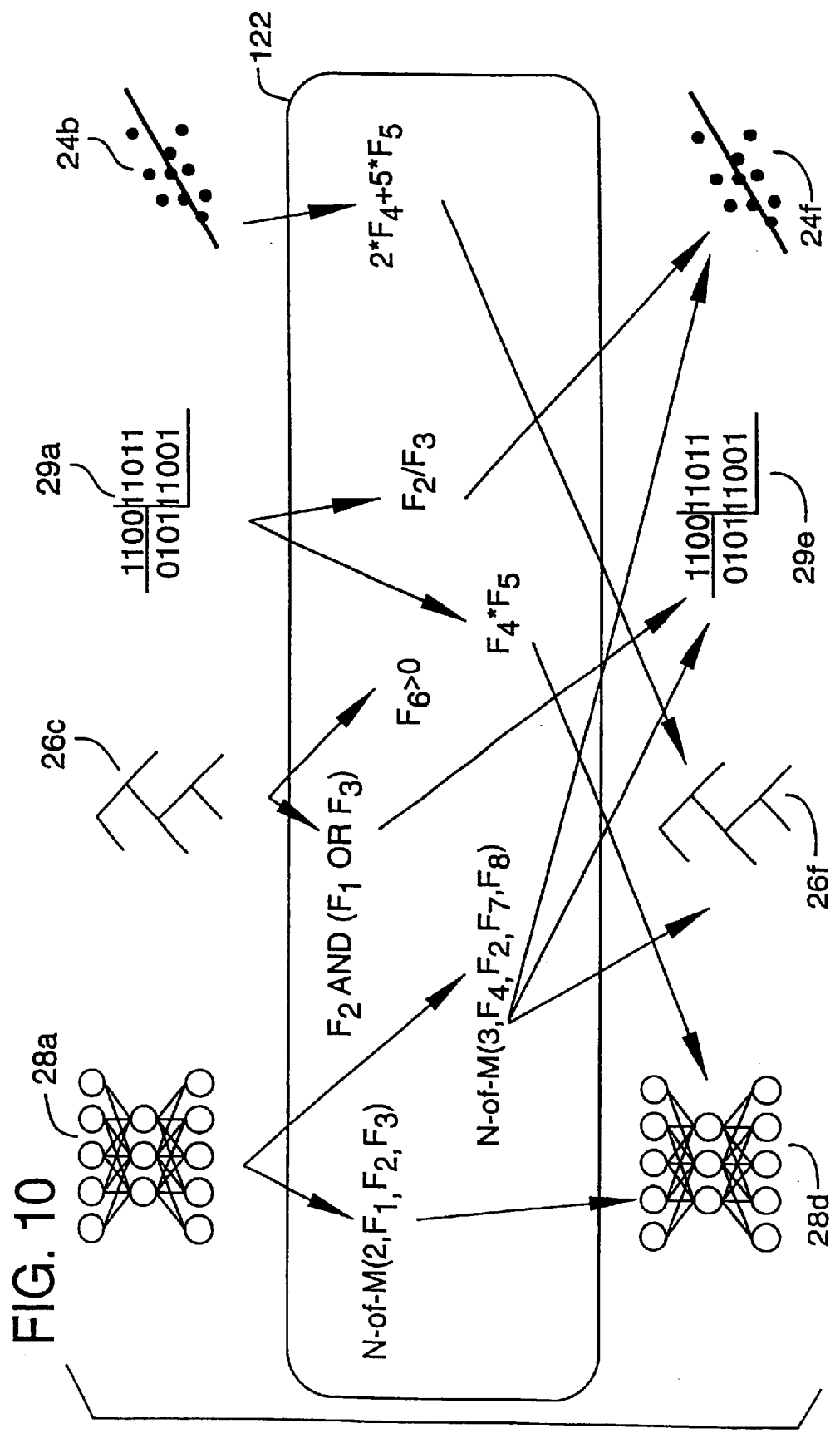
FIG. 10 is a pictorial diagram of the method of selecting input representations in accordance with the invention.

The process of FIG. 7 is shown graphically in FIG. 10. Learning agents such as agents 28a, 26c, 29a, and 24b each produce a prediction method from which feature combinations are extracted by constructor 39 (FIG. 1) and given a fitness measure before being collected in a feature combination pool 122. From this pool feature combinations are then selected for the next generation of learning agents such as 28d, 26f, 29e, and 24f.

A Specific Implementation

As described, a current implementation of the invention includes the C4.5 decision tree induction system and C4.5rules rule extraction tool, the LFC++ constructive induction program and the conjugate gradient descent trained feedforward neural network (CG) from the UTS neural network simulation package. Most of the documented parameters for each of class of learning agent is included in the free parameter vector for that system, along with a specification of either an upper and lower bound for the parameter's values or a list of possible parameter values. For example, the parameter vector for the UTS conjugate gradient descent learning agent includes the number of hidden nodes in the network, the maximum number of iterations before halting, the output tolerance (specifying how close to 1 or 0 an output has to be to count as true or false), a flag for whether or not to use competitive learning on the output, two nominal parameters specifying the kind of line search and direction finding method to use, and three parameters specifying the maximum number of function evaluations per iteration, the minimum function reduction necessary to continue the search and the maximum slope ratio to continue the search. Theses parameters are explained more fully in the documentation available with the source code.

Each learning agent has a method for extracting new features from its output. LFC++, like other constructive induction programs, specifically defines new features as part of its output. For C4.5, the output of the C4.5rules tool was parsed so that each left hand side of each rule was reified into a new feature definition. For the neural network learning agent, a new feature was created for each hidden node defined by the weighted sum of the inputs to that node, with any input whose contribution to that sum was less than the threshold of the node divided by the number of inputs removed from the sum. These extracted features are added to the feature (i.e., meme) pool.

Several other aspects of this implementation must be specified in order for it to work properly. Meme definitions must be stored in a canonical form so that it is possible to detect when two or more generated memes are in effect identical and should have their fitness scores combined. Memes are represented as boolean combinations of primitives or mathematical formula over primitives, which can be straightforwardly compared, although the extension to first order predicate calculus would make this a more difficult problem. The number of memes that an agent uses (i.e. the dimensionality of its input representation) is treated as a free parameter of the agent, and allowed to vary from two to twice the number of primitives. In addition, agents are allowed to prefer memes of their own creation to memes created by other learning agents. A single parameter, ranging over [0,1] specifies the internal meme preference of each agent.

Simulation Results on a Simple Test Problem

The implementation of system 20 described above was applied to an artificial problem designed to be moderately difficult for the machine learning programs included in the system. The problem was to identify whether any three consecutive bits in a nine bit string were on, e.g. 011011011 is false, and 001110011 is true. This problem is analogous both to detecting a win in tic-tac-toe and to solving parity problems, which are known to be difficult for many types of learning systems. There are 512 possible examples, and the problem is simple enough so that the machine learning systems used (even the neural network) run reasonably quickly. This is important, since each program is executed a large number of times (see the computational complexity section, below).

This problem was run on a system that used only LFC++ and the CG learning agents. The population consisted of 10 LFC++ learning agents and 10 CG learning agents, and was run for 10 generations. Six fold cross-validation was used, and there was one meme exchange per generation. This rather modest problem therefore required 2400 learning agent executions, taking more than four days of R4400 CPU time. (The CPU time use was dominated by the 1200 neural network training runs.) Despite the large amount of computation required for this simple problem, it is reasonable to hope that the amount of computation required will grow slowly with more difficult problems (see the computational complexity section, below).

Figure 11:
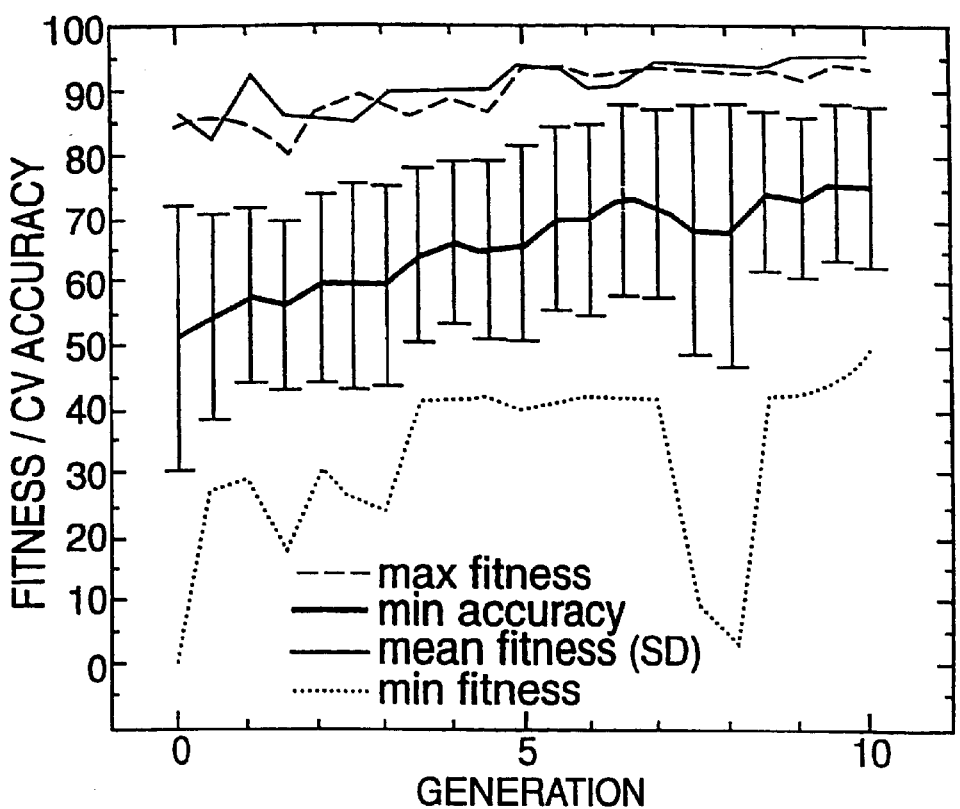
FIG. 11 is a graph of the fitness of prediction methods as a function of the generations of learning agents executed.

This simulation illustrated three significant points. First, the implementation of system 20 was able to consistently improve as it evolved. The improvement was apparent in both the maximum and the average performance in the population, and in both the cross-validation accuracies of the learning agents and in their fitnesses (i.e. accuracy, speed and robustness). FIG. 11 shows these results. In ten generations, the average fitness of the population climbed from 51%% to 75%, and the standard deviation fell from 21% to 12.5%. Looking at the best individual in the population shows that the maximum fitness climbed from 84% to 94%, and the maximum cross-validation accuracy climbed from 82.3% to 95%. Average execution time fell by more than 25% for both classes of learning agents (it fell somewhat more sharply, and in much greater absolute magnitude for the neural network learning agents.)

Figure 12:
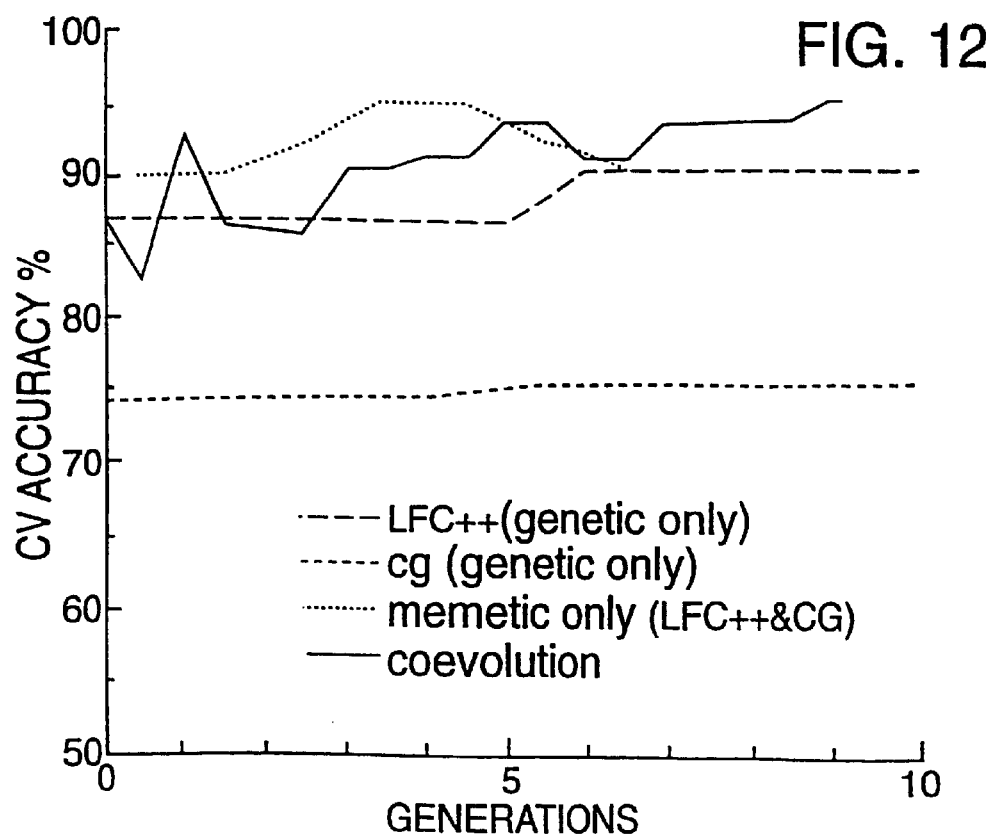
FIG. 12 is a graph of the contributions of the inventive methods to the accuracy of prediction methods as a function of the generations of learning agents executed.

FIG. 12 illustrates the separate contributions of the genetic evolution component and the memetic evolution component compared to coevolution in the performance of the best individual learning agent in the population. Consider first the purely genetic evolution of the free parameter vectors. When there is no memetic component, there is no interaction between the different classes of learning agents, since crossover and other sources of genetic variation apply only to a specific type of learning agent. Using genetic search to find the best free parameter values for a neural network is known to be slow (Yao, 1993). In this genetic-only neural network simulation, only a small improvement was found in the fifth generation. Similarly for the genetic evolution of LFC++'s free parameters, a modest difference was found in the sixth generation. Memetic evolution alone (without changing any of the free parameter values) showed a more significant effect. Because both the neural network and the constructive induction program make contributions to memetic evolution, any synergies between them will appear in the memetic-only curve (see discussion of FIG. 4, below). However, the steady rise of the coevolution curve, compared to the memetic-evolution only curve suggests that some adjustment of the free parameter values to match the representation changes induced by memetic transfer may have a positive effect. At the end of 10 generations, the maximum accuracy of the coevolved population is more than 5 percentage points higher than the memetic only population. However, it is worth noting that the memetic only population equaled that performance figure earlier in the simulation, and then drifted away.

Figure 13:
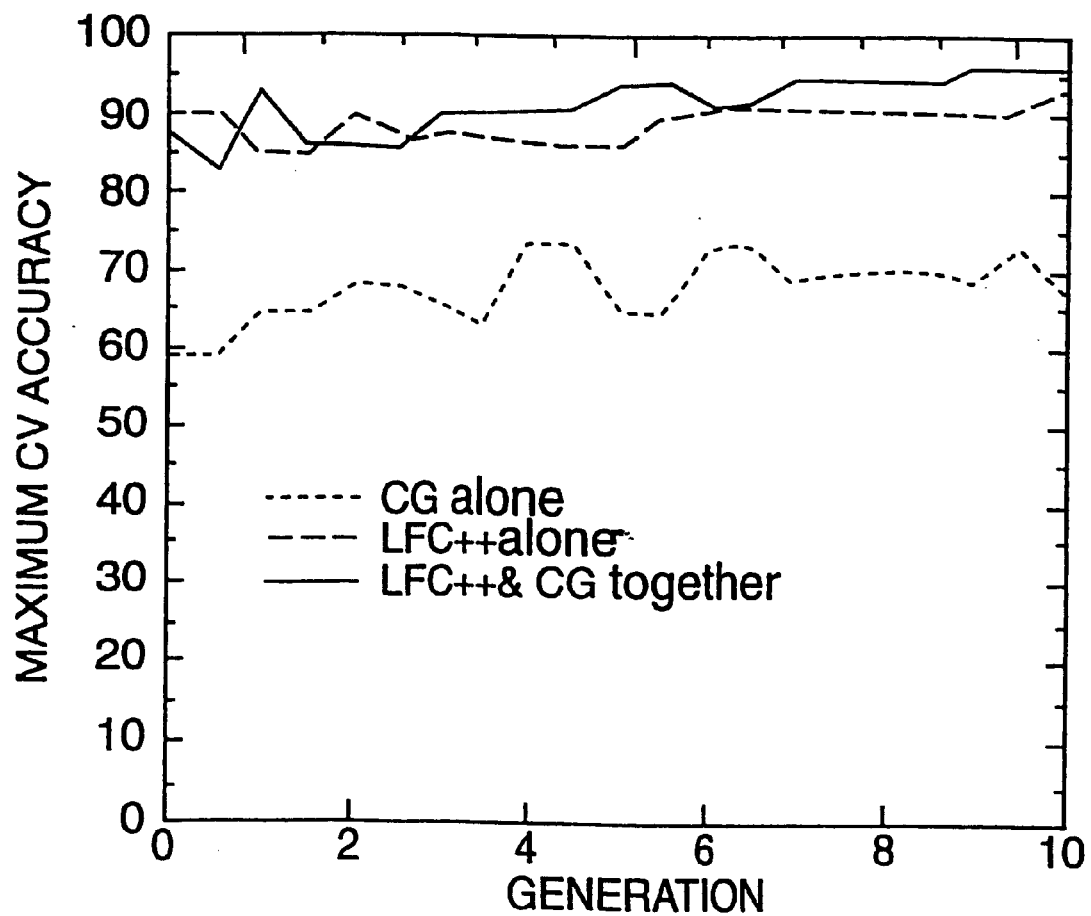
FIG. 13 is a graph of the accuracy of prediction methods resulting from the synergistic interaction of two learning agents as a function of the generations of learning agents executed.

FIG. 13 illustrates the synergy that coevolution finds between the CG agent population and the LFC++ agent population. When run with only a single type of learning agent, the memetic evolution part of the inventive system becomes a kind of constructive induction program, where the output of the learning agent is feed back as an input feature in the next iteration. Since LFC++ is already a constructive induction program, it is somewhat surprising to note that LFC++ agents coevolving with each other still manage a small amount of improvement. Perhaps this is due to the fact that the appropriate features for this problem have three conjuncts, and LFC++ under most free parameter values tends to construct new features from pairs of input features. CG alone does not do very well on this problem. Even when coevolved with itself, its most accurate agent improves only from about 60% to a bit over 70% in ten generations. However, when these two learning methods are combined in a single coevolution learning agent, the results are clearly better than either of the methods used alone. The gap between the best performance of the pair of methods and the best single method tends to be about 5 percentage points in this simulation, and the difference tends to be larger as the population evolves.

In view of the many possible embodiments to which the principles of the invention may be applied, it should be recognized that the illustrated embodiment is only a preferred example of the invention and not as a limitation on its scope. The scope of the invention, rather, is defined by the following claims. I therefore claim as my invention all that comes within the scope and spirit of these claims.

I claim:

1. A computer-implemented method of producing a computer-executable prediction method, the computer-implemented method comprising:

providing training data related to a problem for which a computer-executable prediction method is sought, the training data comprising multiple empirical observations represented by features with values and values for observed event outcomes associated with the feature values stored in a computer-readable medium;

providing at least two software-based computer-executable learning agents, the software-based computer-executable agents including initial input representations of the training data;

training the software-based computer-executable learning agents on the initial input representations of the training data, the software-based computer-executable agents producing in response to the data an initial population of computer-executable prediction methods based on the agents' initial input representations of the training data;

extracting one or more features from the initial population of computer-executable prediction methods produced by the learning agents for combination into one or more feature combinations;

modifying the input representation of at least one of the software-based computer-executable learning agents by including in the input representation at least one of the feature combinations originating from the prediction method of another software-based computer-executable learning agent; and again training the software-based computer-executable learning agents on the modified input representations of the training data to cause the software-based computer-executable learning agents to produce at least one next generation computer-executable prediction method based on the modified agents' input representations, wherein the next generation computer-executable prediction method comprises a set of computer-executable instructions stored in a computer-readable medium and returns a result.

2. The method of claim 1 wherein the extracting comprises:

analyzing a prediction method to identify which features of an agent's input representation are more important and less important to the prediction method; and combining at least two more important of the features to produce a feature combination.

3. The method of claim 1 further comprising:

collecting feature combinations extracted from the prediction methods; and determining a fitness measure for each of the collected feature combinations, wherein the modifying includes selecting a feature combination for an agent's input representation based on the feature combination's fitness measure.

4. The method of claim 3 wherein the determining a fitness measure for a feature combination comprises:

globally assigning a fitness value to each feature combination; and combining the combination's fitness value with a preference value to produce the fitness measure.

5. The method of claim 1 wherein the learning agents are of two different types.

6. The method of claim 1 wherein the learning agents are of the same type but have different parameter values.

7. The method of claim 1 wherein the learning agents have a same list of parameters but different parameter values, the method including:

determining a fitness measure for each learning agent based on the prediction method the agent produces:

selecting the parameter values of at least one of the learning agents based on the agent's fitness measure;

introducing variation into the selected parameter values; and defining another learning agent using the varied parameter values.

8. The method of claim 7 wherein determining a fitness measure comprises determining an accuracy of the prediction method and a completion time for the learning agent.

9. A computer-readable medium on which is stored a computer program comprising instructions which, when executed, perform the method of claim 1.

10. The method of claim 1 wherein the method is applied to the technical field of data mining.

11. The method of claim 1 wherein the method is applied to the technical field of weather forecasting.

12. The method of claim 1 wherein the method is applied to the technical field of data analysis.

13. The method of claim 1 wherein the software-based computer-executable learning agents are chosen from the following classes:

a neural network; and a decision tree.

14. The method of claim 1 wherein the software-based computer-executable learning agents are chosen from the following classes:

a neural network;

a decision tree;

a statistical/Bayesian inference; and a genetic algorithm.

15. A computer-implemented method of producing a prediction method, the method comprising:

providing training data related to a problem for which a prediction method is sought, the training data represented by features with values stored in a computer-readable medium;

providing at least two learning agents having a same parameter list but different parameter values;

training the learning agents on the training data, each agent producing in response to the data a prediction method based on the agent's parameter values;

determining a fitness measure for each learning agent based on the prediction method the agent produces;

selecting the parameter values of at least one of the learning agents based on the agent's fitness measure;

introducing variation into the selected parameter values;

defining another learning agent using the varied parameter values; and again training the learning agents on the training data to cause a learning agent to produce a prediction method based on the varied parameter values, wherein the prediction method comprises a set of computer-executable instructions stored in a computer-readable medium and returns a result.

16. A computer-implemented method of producing a prediction method, the method comprising the following steps:

providing training data related to a problem for which a prediction method is sought, the training data represented by features with values stored in a computer-readable medium;

providing a plurality of learning agents of which at least two have a same parameter list but different parameter values, the learning agents including input representations;

training the learning agents on the training data, each agent producing in response to the data a prediction method based on the agent's parameter values and input representation;

determining a fitness measure for each learning agent based on the prediction method the agent produces;

selecting the parameter values of at least one of the learning agents based on the agent's fitness measure;

introducing variation into the selected parameter values;

defining another learning agent using the varied parameter values;

extracting feature combinations from the prediction methods produced by the learning agents, wherein the extracting comprises combining at least two of the features;

modifying the input representation of a learning agent by including in the input representation a feature combination extracted from another learning agent; and again training the learning agents on the training data to cause a learning agent to produce a prediction method based on the varied parameter set and the modified input representation, wherein the prediction method comprises a set of computer-executable instructions stored in a computer-readable medium and returns a result.

17. A computer-implemented system for producing a prediction method for a problem, comprising:

a training data set related to a problem for which a prediction method is sought, the training data set represented by features with values stored in a computer-readable medium;

at least two learning agents, the agents including input representations; and at least one computer programmed for:

training the learning agents on the data set, each agent producing in response to the data a prediction method based on the agent's input representation;

extracting feature combinations from the prediction methods produced by the learning agents, wherein the extracting comprises combining at least two of the features;

modifying the input representation of a learning agent by including in the input representation a feature combination extracted from another learning agent; and again training the learning agents on the data set to cause a learning agent to produce a prediction method based on the agent's modified input representation, wherein the prediction method comprises a set of computer-executable instructions stored in a computer-readable medium and returns a result.

18. The system of claim 17 wherein at least two learning agents have a same parameter list but different parameter values, and the computer is further programmed for:

training the learning agents on the data set, each agent producing in response to the data a prediction method based on the agent's parameter values;

determining a fitness measure for each learning agent based on the prediction method the agent produces;

selecting the parameter values of a learning agent based on the agent's fitness measure;

introducing variation into the selected parameter values;

defining another learning agent using the varied parameter values; and again training the learning agents on the data set to cause a learning agent to produce a prediction method based on the varied parameter values, wherein the prediction method comprises a set of computer-executable instructions stored in a computer-readable medium.

19. A general purpose computer for producing a prediction method for a problem, the system comprising:

computer processor means for processing data;

storage means for storing data in a storage medium, wherein the stored data comprises training data related to a problem for which a prediction method is sought, the training data represented by features with values, and the stored data further comprises at least two learning agents, the learning agents including input representations;

first means for training the learning agents on the data set, at least two of the agents producing in response to the data a prediction method based on the agent's input representation;

second means for extracting feature combinations from the prediction methods produced by the learning agents;

third means for modifying the input representation of a learning agent by including in the input representation a feature combination extracted from another learning agent; and fourth means for again training the learning agents on the data set to cause a learning agent to produce a computer-executable prediction method based on the agent's modified input representation.

20. A computer-readable medium comprising computer-executable instructions for performing at least the following:

for training data comprising a set of features and indicating a set of observations comprising values for the features and values indicating observations of results related to the feature values, training a plurality of software-based learning agents to generate a plurality of computer-executable functions, wherein the computer-executable functions provide predicted values given a set of values for at least a subset of the features;

selecting a subset of the features incorporated into a first of the computer-executable functions generated by a first software-based learning agent and combining the features into a feature combination;

based on the feature combination and the training data, generating modified training data comprising the feature combination and values for the feature combination; and training the software-based learning agents on the modified training data to generate a plurality of second-generation computer-executable functions, wherein the second-generation computer-executable functions provide predicted values given a set of values for at least the feature combination;

wherein the features of the feature combination are extracted from the first computer-executable function originating from a first software-based learning agent and the feature combination is incorporated into training data from which a second software-based learning agent generates a second, second-generation, computer-executable function.

21. The computer-readable medium of claim 20 wherein the first and second software-based learning agents are of different classes.

22. The computer-readable medium of claim 20 wherein:

the first software-based learning agent is associated with a neural network; and the second software-based learning agent is associated with a decision tree.

* * * * *

UNITED STATES PATENT AND TRADEMARK OFFICE
CERTIFICATE OF CORRECTION

PATENT NO. : 6,449,603 B1
DATED : September 10, 2002
INVENTOR(S) : Lawrence E. Hunter It is certified that error appears in the above-identified patent and that said Letters Patent is hereby corrected as shown below:

Title page,
Item [56], References Cited, the following should be listed:
-- U.S. PATENT DOCUMENTS

| | | |
|---|---|---|
| 4,881,178 | 11/14/1989 | Holland et al. |
| 5,140,530 | 8/18/1992 | Guha et al. |
| 5,214,746 | 5/25/1993 | Fogel et al. |
| 5,245,696 | 9/14/1993 | Stork et al. |
| 5,249,259 | 9/28/1993 | Harvey |
| 5,255,345 | 10/19/1993 | Shaefer |
| 5,394,509 | 2/28/1995 | Winston |
| 5,581,657 | 12/3/1996 | Lyon |

FOREIGN PATENT DOCUMENTS
-- WO 97/44741      11/27/1997      PCT --

OTHER DOCUMENTS

-- Fawcett, T.E., and Utgoff, P.E., A Hybrid Method for Feature Generation, in <u>Machine Learning: Proceedings of the Eighth International Workshop on Machine Learning</u> (eds. Birnbaum and Collins), Morgan Kaufmann Publishers, Inc., San Mateo, California, 137-141 (1991).

Hunter, L., Coevolution Learning: Synergistic Evolution of Learning Agents and Problem Representations, *Proceedings of the Third International Workshop on Multistrategy Learning*, Harper's Ferry, WV, 85-93 (1996).

Langley, P., Selection of Relevant Features in Machine Learning, in *Proceedings of AAAI Fall Symposium on Relevance*, AAAI Press, New Orleans, LA, 127-131 (1994).

Sheth, B., and Maes, P., Evolving Agents for Personalized Information Filtering, in *Proceedings of the Ninth Conference on Artificial Intelligence for Applications*, IEEE Computer Society Press, Los Alamitos, California, 345-352 (1993).

Silver et al., ILS: A System of Learning Distributed Heterogeneous Agents for Network Traffic Management, in *Proceedings of the International Conference on Communications*, Institute of Electrical and Electronics Engineers, Geneva, 1869-1874 (1993).
Internet abstract of U.S. Patent No. 5,222,197 issued 6/22/1993 (Teng et al.)   --

Internet abstract of U.S. Patent No. 5,343,554 issued 8/30/1994 (Koza et al.)
Internet abstract of U.S. Patent No. 5,390,282 issued 2/14/1995 (Koza et al.)
Internet abstract of U.S. Patent No. 5,390,283 issued 2/14/1995 (Eshelman et al.)
Internet abstract of U.S. Patent No. 5,434,796 issued 7/18/1995 (Weininger et al.)
Internet abstract of U.S. Patent No. 5,446,829 issued 8/29/1995 (Wang et al.)
Internet abstract of U.S. Patent No. 5,481,650 issued 1/12/1996 (Cohen et al.)
Internet abstract of U.S. Patent No. 5,586,218 issued 12/17/1996 (Allen)
Internet abstract of U.S. Patent No. 5,598,509 issued 1/28/1997 (Takahashi et al.)

UNITED STATES PATENT AND TRADEMARK OFFICE
CERTIFICATE OF CORRECTION

PATENT NO.   : 6,449,603 B1
DATED        : September 10, 2002
INVENTOR(S)  : Lawrence E. Hunter It is certified that error appears in the above-identified patent and that said Letters Patent is hereby corrected as shown below:

Column 3,
Line 6, "flow chart" should read -- flowchart --.

Column 4,
Line 3, "statistical/mayesian" should read -- statistical/Bayesian --.

Column 5,
Line 15, "genuine" should read -- *genome* --.

Signed and Sealed this

Thirteenth Day of July, 2004

JON W. DUDAS
*Acting Director of the United States Patent and Trademark Office*